United States Patent [19]

Varner

[11] Patent Number: 4,608,762
[45] Date of Patent: Sep. 2, 1986

[54] BULLET SEATING GAUGE AND METHOD FOR DETERMINING CASE BASE END TO BULLET TIP DISTANCE

[76] Inventor: Robert F. Varner, Box 167A, Rte. 2, Antwerp, Ohio 45813

[21] Appl. No.: 760,605

[22] Filed: Jul. 30, 1985

[51] Int. Cl.⁴ .............................................. G01B 3/46
[52] U.S. Cl. ...................................... 33/506; 102/430
[58] Field of Search ........................... 33/506; 102/430

[56] References Cited

U.S. PATENT DOCUMENTS

| | | | |
|---|---|---|---|
| 1,197,079 | 9/1916 | Townsend | 33/125 |
| 1,251,247 | 12/1917 | Lanfranco | 33/125 |
| 1,256,255 | 2/1918 | Porter | 33/506 X |
| 2,301,984 | 11/1942 | Turnbull | 29/87.1 |
| 2,502,613 | 4/1950 | Zanolio | 33/506 X |
| 2,744,275 | 5/1956 | Geltner | 15/118 |
| 2,939,318 | 6/1960 | Armi et al. | 73/167 |
| 3,015,892 | 1/1962 | Stuart | 33/169 |
| 3,209,461 | 10/1965 | Wilson | 33/506 |
| 3,780,438 | 12/1973 | Styczynski | 33/506 |
| 3,962,793 | 6/1976 | Blume | 33/143 R |
| 4,216,585 | 8/1980 | Hatter | 33/169 B |

Primary Examiner—William D. Martin, Jr.
Attorney, Agent, or Firm—Harvey B. Jacobson

[57] ABSTRACT

The bore communicating primer pocket and the interior of the base of a cartridge case is internally threaded and a threaded shaft end is threaded through the bore to a position with the terminal end of the shaft spaced inwardly of the open end of the casing. A bullet is telescoped rearwardly into the open end of the casing an excessive amount into seated engagement with the shaft end and the entire combination comprising the shaft, casing and bullet is forwardly telescoped through the receiver of a rifle subsequent to the removal of the rifle bolt and to a position with the casing fully seated within the receiver of the rifle barrel. Thereafter, the shaft is threaded forwardly relative to the casing in order to gradually displace the bullet from the open end of the casing until such time as the maximum girth area of the bullet engages the rifling in the rear end of the rifle bore. Thereafter, the combination is rearwardly displaced from the rifle receiver through the utilization of a rod passed rearwardly through the rifle bore from the muzzle end thereof and the overall length of the cartridge and bullet is measured by any suitable tool or a reloader seating die, through utilization of an adapter sleeve telescoped over the casing, is telescoped over the casing and bullet combination and is adjusted according to the overall length of the casing and bullet.

6 Claims, 4 Drawing Figures

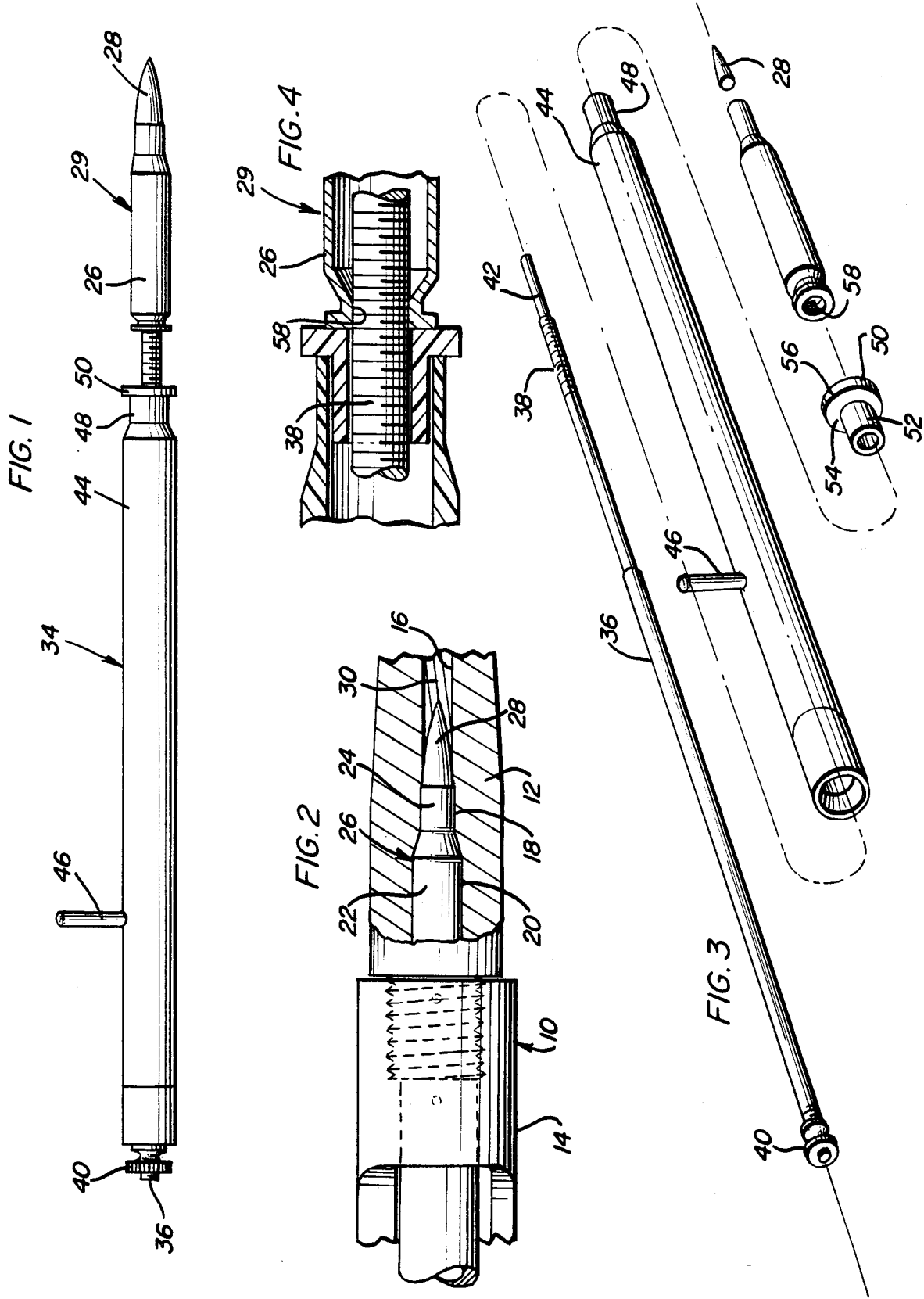

BULLET SEATING GAUGE AND METHOD FOR DETERMINING CASE BASE END TO BULLET TIP DISTANCE

BACKGROUND OF THE INVENTION

1. Field of the Invention

This invention relates to a gauge operative to determine the proper case base end-to-bullet tip distance, during a reloading operation, which will insure initial seating of the reloaded bullet against the rifling in the receiver end of a barrel as the case and bullet combination is seated in the receiver of a rifle.

2. Description of Related Art

Various different gauges and tools incorporating some of the general structural and operational features of the instant invention heretofore have been provided for determining initial bullet velocity, handling a rifle barrel, determining the depth of a threaded bore, inserting a firing pin spring and for determining barrel interior ballistics as well as tools for maintenance of a firearm and for cleaning a firearm bore. Examples of these previously known devices are disclosed in U.S. Pat. Nos. 1,197,079, 1,251,247, 2,301,984, 2,744,275, 2,939,318, 3,015,892, 3,962,793 and 4,216,585. However, these previously known devices have not been specifically designed to determine the exact case base end-to-bullet tip distance during a reloading operation which will insure initial seating, only, of the bullet of a given case and bullet combination against the rifling of the barrel of a given rifle adjacent the receiver of the rifle when the case is seated within the receiver.

It is important from a standpoint of improved bullet trajectory, maximum muzzle velocity of a bullet and minimum rifle bore wear for the bullet of a given case and bullet combination to be initially seated against the rifling of a given rifle barrel bore when the base of the case and bullet combination is seated in the receiver of the barrel. Accordingly, the main object of this invention is to provide an apparatus and method for determining the proper case base end-to-bullet tip distance which will insure initial seating, only, of the bullet of a reloaded case and bullet combination when the case is seated in the receiver of a given rifle.

Another object of this invention is to provide a bullet seating gauge which may be used in conjunction with all center fire case and bullet combinations.

Another important object of this invention is to provide an apparatus and method in accordance with the preceding objects and which will enable the proper initial seating of a bullet against the rifling in substantially any rifle barrel bore receiver end.

Yet another object of this invention is to provide a bullet seating gauge which may be used effectively in conjunction with substantially any reloader seating die.

A final object of this invention to be specifically ennumerated herein is to provide a bullet seating gauge in accordance with the preceding objects and which will conform to convention forms of manufacture, be of simple construction and easy to use so as to provide a device that will economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is an elevational view of the bullet seating gauge in operative association with a case and bullet combination;

FIG. 2 is a fragmentary sectional view illustrating the manner in which the bullet seating gauge may be used to fully seat a bullet case in the receiver end of barrel bore with bullet supported in the open end of the case initially seated, only, against the barrel bore rifling;

FIG. 3 is an exploded perspective view of the bullet seating gauge and an associated case and bullet; and FIG. 4 is an enlarged fragmentary longitudinal sectional view of the adjacent components of the gauge and associated cartridge case.

DESCRIPTION OF THE PREFERRED EMBODIMENT

With reference now more specifically to FIG. 2, the numeral 10 generally designates a rifle including a barrel portion 12 and a receiver portion 14. The receiver is tubular and opens into the base end of the barrel portion 12.

The barrel portion 12 includes a bore 16 formed longitudinally therethrough and the base end of the barrel portion 12 includes successively enlarged counter-bores 18 and 20 in which to seatingly receive the body and neck portions 22 and 24 of a cartridge case referred to in general by the reference numeral 20, the tubular neck portion 24 of the cartridge case 26 having a bullet 28 snuggly to partially telescoped therein.

During normal operation of the rifle 10 the assembly 29 including cartridge case 26 and bullet 28 is chambered or fully seated within the counter-bores 18 and 20 and held therein by the bolt (not shown) of the rifle 10. However, when the assembly 29 is chambered or fully seated within the counter-bores 18 and 20 it is imperative for optimum bullet projectory, muzzle velocity and minimum barrel bore wear for the bullet 28 to have its maximum girth area initially, only, seated against the rifling 30 in the bore 16 forward of the counter-bore 18.

Further, to reduce the expenses incurred in the use of the rifle 10 and to provide more uniform and proper charge loading and chambering compatability of the combined cartridge and bullet assembly 29 with the rifle 10 the user of the rifle 10 will often reload his own ammunition. However, when reloading ammunition the total length of the combined cartridge and bullet assembly 29 must be tailored to the cartridge chambering area of the rifle barrel in which the assembly 29 is to be used in order to obtain optimum trajectory, the greatest muzzle velocity and to maintain barrel bore wear at a minimum.

If the overall length of a reloaded case and bullet assembly 29 is excessive, final seating of the case and bullet assembly within the chamber end of the barrel will be difficult. Further, if the overall length of the case and bullet assembly 29 is shorter than optimum length the bullet 28 will not be initially seated against the rifling 30 and thus will be initially projected through the neck portion 24 of the cartridge case 26 before the rifling 30 has an opportunity to initiate rotation of the bullet 28. Accordingly, when reloading rifle ammunition is is very important that the overall length of the assembly 29 be precisely that length which will allow full seating of the cartridge case 26 within the counter-bores 18 and 20 as the bullet 28 is initially seated against the rifling 30.

The bullet seating gauge of the instant invention is referred to in general by the reference numeral 34 and includes an elongated rod 36 having an externally threaded end portion 38 on one end and a knob 40 on its other end. The externally threaded end portion 38 includes a slightly diametrically reduced terminal end 42 and the rod 36 is loosely telescoped through a sleeve 44 having an outwardingly projecting handle 46 adjacent one end and including a diametrically reduced end 48 on its end remote from the handle 46. In addition, a stepped guide sleeve 50 has its diametrically reduced end 52 telescoped into the diametrically reduced end 48, the shoulder 54 of the sleeve 50 defined by the larger diameter end 56 thereof being abutted against the terminal end of the diametrically reduced end 48.

The threaded end portion 38 extends through the sleeve 50 and the primer pocket of the center fire casing cartridge 26 is drilled out and internally threaded as at 58 to threadingly receive the end portion 38 therethrough. The end portion 38 is threaded into the cartridge casing 26 to an extent with the terminal end 42 is disposed in the neck portion 24 of the casing cartridge 26. Then, the bullet 28 is telescoped into the neck portion 24 and abutted against the terminal end 42, the initial positioning of the bullet 28 within the neck portion 24 being such that the bullet 28 is excessively telescoped into the neck portion 24.

At this point, the bolt of the rifle 10 is removed and the bullet seating gauge 34 is utilized to insert the cartridge case and bullet assembly 29 through the receiver area of the rifle 10 and into position with the casing cartridge 26 seated in the manner illustrated in FIG. 2 with the body and neck portions 22 and 24 seated in the counter-bores 20 and 18, respectively. Then, the knob 40 is rotated to thread the rod 36 through the threaded bore 58 until the terminal end 42 engages the bullet 28 and displaces the latter forwardly into position with the maximum girth portion of the bullet 28 seated against the rifling 30. The seating of the bullet 28 against the rifling 30 is readily noted by a substantial increase in the resistance to turning knob 40. Then, while maintaining the rod 36 and casing cartridge 26 against relative rotation, a ramrod is used throught the muzzle end of the bore 16 to rearwardly displace the gauge 34 and the assembly 29 supported therefrom. After removal of the gauge and assembly 29 through the rear of the receiver 14, the gauge 34 is held in an upright position with the assembly 29 disposed uppermost and a specific length adapter sleeve (not shown) is loosely downwardly telescoped over the combined casing and bullet assembly 29 and rests upon the sleeve 50. At this point, the seating die (not shown) of an associated reloader may be downwardly telescoped over the combined casing and bullet assembly 29 and abutted against the aforementioned sleeve. Thereafter, the adjusting screw of the die may be turned inward until it contacts the tip of the bullet 28 after which the adjusting screw may be locked in position and the die may be place upon the reloading apparatus.

Otherwise, after removal of the gauge 34 and casing and bullet assembly 29 from the receiver 14, a pair of outside calipers may be used to accurately measure the overall length of the casing and bullet assembly 29 and that measurement may be properly transferred to the seating die of the associated reloader machine.

At this point it is pointed out that if the length of the combined casing and bullet assembly 29 after removal through the receiver 14 is to be measured by an outside caliper, the sleeve 44 and sleeve 50 are not required. In such case, the rod 36 is may be used merely as a handle to initially insert the casing and bullet assembly 29 forward through the receiver 14 into the seated position thereof illustrated in FIG. 2 and to apply forward while the rod is threaded through the bore 58 until the terminal end 42 forwardly displaces the bullet 28 into initial seated engagement with the rifling 13. Then, a bore cleaning rod or the like may be used through the muzzle end of the bore 16 in order to rearwardly displace the cartridge and bullet assembly 29 as well as the rod 36 while maintaining the rod 36 and casing 26 against relative rotation. Then, the total length of the casing and bullet assembly 29 may be measured by an outside caliper.

The foregoing is considered as ilustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A bullet seating gauge for use with a given cartridge case and bullet combination and for determining the proper case base end-to-bullet tip distance, during reloading operations, which will insure initial seating of the bullet against the rifling of a particular gun barrel adjacent the receiver thereof in which said combination is to be seated, said gauge including a bullet case having a threaded primer pocket bore and a shaft having one threaded end threaded inwardly through said primer pocket bore to a position with the terminal end of said threaded end disposed inwardly of the open bullet receiving end of the bullet case, and a bullet for said case slidingly received in said open case end and including an inner end abutted against said terminal end, said bullet being gradually partially projectable outwardly through said open case end upon further threading of said one shaft end inwardly through said primer pocket bore.

2. The bullet seating gauge of claim 1 wherein said shaft includes an elongated handle sleeve slideable thereon intermediate said casing cartridge and the other end of said shaft.

3. The gauge of claim 2 wherein said handle sleeve includes an apertured end wall on the end thereof remote from said casing cartridge and through which the other end of said shaft is slideably received, said other end of said shaft having an abutmemt thereon disposed outward of said apertured end wall.

4. The gauge of claim 2 wherein the end portion of said sleeve remote from said cartridge casing includes a laterally outwardly projecting handle.

5. The gauge of claim 4 wherein said handle sleeve includes an apertured end wall on the end thereof remote from said casing cartridge and through which the other end of said shaft is slideably received, said other end of said shaft having an abutmemt thereon disposed outward of said apertured end wall.

6. The method of precisely determining the overall length of a cartridge and bullet combination to be used in a given rifle, said method including internally threading the bore of a center fire cartridge casing communicating the primer pocket of the casing with the interior of the base portion of the casing, threading one end of a threaded shaft through said threaded bore to a position with the terminal end of said threaded end spaced inward of the open bullet receiving end of the cartridge case, partially telescoping a bullet into the open end of the cartridge case, forwardly inserting the combination comprising the shaft, the cartridge casing and the bullet through the receiver of a rifle subsequent to removal of the rifle bolt to fully seat the cartridge casing in the receiver end of the rifle barrel, forwardly threading said one end of the shaft into the cartridge casing to engage the terminal end thereof with the rear of the bullet and to displace the bullet forwardly relative to the casing into initial seated engagement with the rifling at the rear end of the rifle barrel, rearwardly displacing said assembly from the receiver end of the rifle barrel through the utilization of a rod inserted rearwardly into the muzzle end of the rifle bore while maintaining the rod and casing against relative rotation, and thereafter measuring the overall length of the casing and bullet while maintaining the shaft and casing against relative rotation.

* * * * *